US012749152B2

(12) United States Patent
Ouchi

(10) Patent No.: US 12,749,152 B2
(45) Date of Patent: Sep. 29, 2026

(54) IMAGE PROCESSING SYSTEM AND IMAGE PROCESSING METHOD

(71) Applicant: Hitachi High-Tech Corporation, Tokyo (JP)

(72) Inventor: Masanori Ouchi, Tokyo (JP)

(73) Assignee: Hitachi High-Tech Corporation, Tokyo (JP)

(*) Notice: Subject to any disclaimer, the term of this patent is extended or adjusted under 35 U.S.C. 154(b) by 444 days.

(21) Appl. No.: 18/425,096

(22) Filed: Jan. 29, 2024

(65) Prior Publication Data

US 2025/0245784 A1 Jul. 31, 2025

(51) Int. Cl.
*G06T 5/50* (2006.01)
*G06T 7/00* (2017.01)

(52) U.S. Cl.
CPC .............. *G06T 5/50* (2013.01); *G06T 7/0004* (2013.01); *G06T 2207/20081* (2013.01); *G06T 2207/20084* (2013.01); *G06T 2207/20092* (2013.01); *G06T 2207/30148* (2013.01)

(58) Field of Classification Search
CPC ..................... G06T 5/50; G06T 7/0004; G06T 2207/20081; G06T 2207/20084; G06T 2207/20092; G06T 2207/30148
See application file for complete search history.

(56) References Cited

U.S. PATENT DOCUMENTS

| | | | | |
|---|---|---|---|---|
| 11,531,844 B2 * | 12/2022 | Bharti | G06V 20/69 |
| 11,756,182 B2 * | 9/2023 | Fang | G06T 7/001 382/149 |
| 12,298,524 B2 * | 5/2025 | Vuong | G02B 27/0905 |
| 12,444,025 B2 * | 10/2025 | Frosio | G06T 5/50 |
| 12,561,823 B2 * | 2/2026 | Fukuda | G01N 23/18 |
| 2012/0025074 A1 | 2/2012 | Barbi et al. | |
| 2020/0285883 A1 | 9/2020 | Hiasa | |
| 2022/0261958 A1 | 8/2022 | Akkaraju et al. | |
| 2024/0085355 A1 * | 3/2024 | Tomita | G01B 15/04 |

FOREIGN PATENT DOCUMENTS

| | | |
|---|---|---|
| JP | 2015-181122 A | 10/2015 |
| JP | 2020-119333 A | 8/2020 |
| JP | 2020-144489 A | 9/2020 |

* cited by examiner

*Primary Examiner* — Gregory M Desire
(74) *Attorney, Agent, or Firm* — Crowell & Moring LLP

(57) ABSTRACT

To implement image synthesis without loss of surface information of SE images and shadow information of BSE images, the present disclosure proposes image processing techniques include applying data of a first quality image (low quality image) to a trained model, estimating a structural feature and a material feature of a second quality image (high quality image) corresponding to the first quality image, calculating at least one shadow datum based on the structural feature and a synthesis parameter and calculating at least one gradation datum based on the material feature and a synthesis parameter, generating a synthesized image from the at least one shadow datum and the at least one gradation datum, and outputting the synthesized image as a prediction result of the second quality image (see FIG. 8).

17 Claims, 10 Drawing Sheets

IMAGE PROCESSING SYSTEM AND IMAGE PROCESSING METHOD

BACKGROUND

Technical Field

The present disclosure relates to an image processing system and an image processing method.

Background Art

As a method for reviewing defects of a semiconductor circuit pattern, a known method uses images in which a sample as a defect review target is captured, with which a user observes defects in detail. Such a method for reviewing defects of a semiconductor circuit pattern may use a scanning electron microscope to acquire images.

Conventionally, as a method for improving visibility of a semiconductor circuit pattern and defects on the circuit pattern, a variety of image processing techniques are known to improve image quality, such as contrast enhancing processing through histogram equalization and the like, noise reduction processing, and superresolution processing. As an example of such conventional methods, JP 2020-144489 A discloses a method of converting a low quality image into a high quality image using a trained neural network and a method of training the neural network.

To improve visibility of a circuit pattern and defects on the circuit pattern, the direction and intensity of the shadow in the circuit pattern need to be adjusted, as well as the brightness in accordance with material characteristics.

Typically, for detailed observation of the structure of defects and irregularities of the circuit pattern, the scanning electron microscope acquires a plurality of shaded images with different shadow information and a plurality of top-down images with substantially no shadow information, and then combines the acquired images. Such a typical synthesized image generation method acquires the shaded image as a backscattered electron image (BSE image), and the top-down image as a secondary electron image (SE image), for example. In this case, the method combines irregularity information (shadow information) of BSE images with SE images having excellent detailed information on the sample surface, and creates a synthesized image for defect review. This method combines together the SE images and the BSE images in a given mixing ratio.

SUMMARY

Unfortunately, the methods disclosed in JP 2020-144489 A perform the processing uniformly across the entire image for image quality improvement. This may consequently cause excessive enhancement of shadows, reduction of contour sharpness, or occurrence of artifacts.

In addition, as described above, the typical synthesized image generation method generates a synthesized image by combining together signals of the SE images and the BSE images. The synthesized image contains surface information of the SE image and shadow information of the BSE image in amounts (i.e., information amounts) that are less than their respective information amounts before the synthesis according to the given mixing ratio. This means that as compared to the surface information and the shadow information of the images before the synthesis, the surface information and the shadow information are lost in the synthesized image.

In view of the above circumstances, the present disclosure provides image synthesis techniques without loss of the surface information of the SE image and the shadow information of the BSE image.

(i) In view of the foregoing, the present disclosure proposes an image processing method performed by a computer that trains a machine learning model using a plurality of images acquired with respect to a target sample under different imaging conditions, to generate a trained model for converting a first quality image into a second quality image having a higher image quality than the first quality image. The image processing method comprises: receiving at least one machine learning model, a plurality of first quality images, and a plurality of second quality images having a higher image quality than the first quality images; applying data of the plurality of first quality images to the at least one machine learning model and estimating a structural feature and a material feature of the second quality image corresponding to the plurality of first quality images; calculating at least one first shadow datum based on the structural feature; calculating at least one second shadow datum from the plurality of second quality images; comparing the at least one first shadow datum and the at least one second shadow datum and acquiring a first comparison result; calculating at least one first gradation datum based on the material feature; calculating at least one second gradation datum from the plurality of second quality images; comparing the at least one first gradation datum and the at least one second gradation datum and acquiring a second comparison result; and updating parameters of the at least one machine learning model based on the first comparison result and the second comparison result.

(ii) In addition, the present disclosure proposes an image processing method performed by a computer that applies a first quality image of a target sample to a trained model, to predict and output a second quality image having a higher image quality than the first quality image. The image processing method comprises: receiving a plurality of first quality images and a synthesis parameter; applying data of the first quality image to the trained model and estimating a structural feature and a material feature of the second quality image corresponding to the first quality image; calculating at least one shadow datum based on the structural feature and the synthesis parameter; calculating at least one gradation datum based on the material feature and the synthesis parameter; and generating a synthesized image from the at least one shadow datum and the at least one gradation datum, and outputting the synthesized image as a prediction result of the second quality image.

(iii) Further related features will become apparent from the following descriptions and the attached drawings. Aspects of the present disclosure may be achieved or implemented by various elements and various combinations of such elements as disclosed in the following detailed descriptions and the claims that follow.

It should be understood that the descriptions that follow are for exemplary purposes only, and do not in any way represent a limitation of the scope of the claims or application examples of the present disclosure.

According to the techniques of the present disclosure, it is possible to acquire a synthesized image (high quality predicted image) without loss of surface information of the SE image and shadow information of the BSE image.

DETAILED DESCRIPTION

The present embodiment proposes an image processing technique for synthesizing sample images acquired under different detection conditions, enabling manipulation of the brightness and shadow of the images independently of each other.

Hereinafter, the present embodiment of the present disclosure will be described with reference to the attached drawings. In the attached drawings, functionally identical elements may be designated with identical numerals. The attached drawings illustrate embodiments and implementation examples in accordance with the principles of the present disclosure. However, these are provided to assist an understanding of the present disclosure and should not be construed as limiting the present disclosure. It should be understood that the descriptions that follow are for exemplary purposes only, and do not in any way represent a limitation of the scope of the claims or application examples of the present disclosure.

While the present embodiment is described in sufficient detail to enable a person skilled in the art to practice the present disclosure, it will be understood that other implementations or embodiments are also possible, and that various changes to configurations or structures and various substitutions of elements may be made without departing from the scope and spirit of the technical concepts of the present disclosure. Accordingly, the following descriptions are not to be interpreted in a limiting sense.

<Configuration Example of Image Generation Tool>

Figure 1:
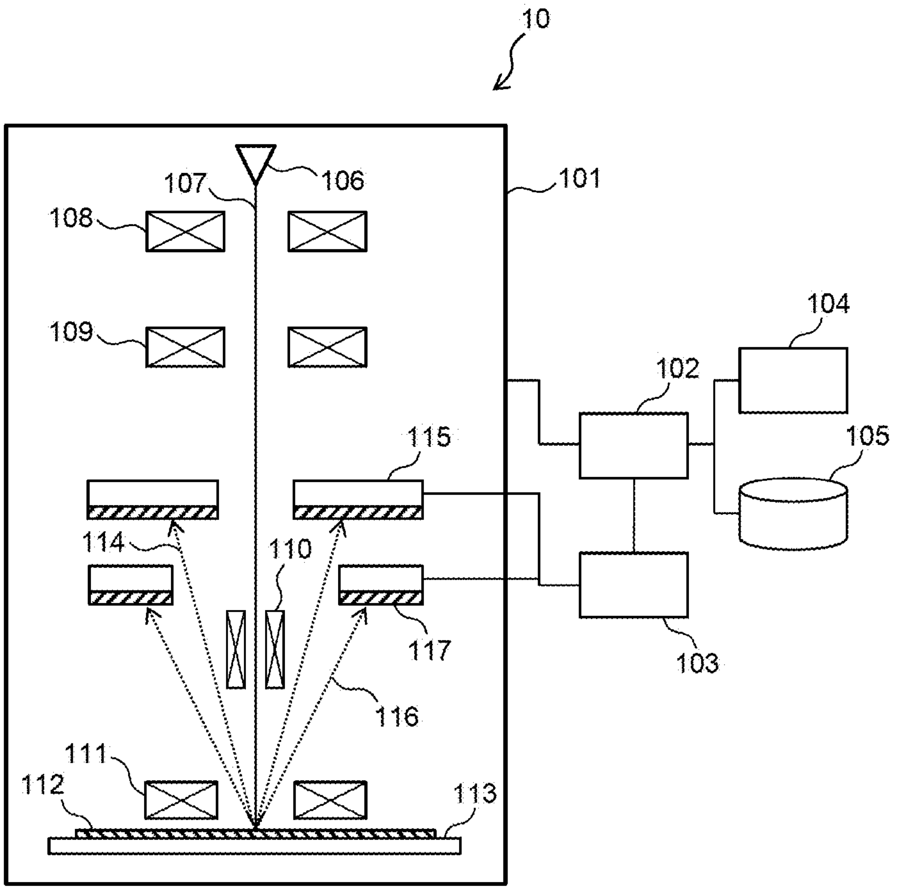
FIG. 1 illustrates a configuration example of a scanning electron microscope (SEM) 10 that is an example of an image generation tool for acquiring a semiconductor pattern image as an image processing target in an image processing system according to the present embodiment.

FIG. 1 illustrates a configuration example of a scanning electron microscope (SEM) 10 that is an example of an image generation tool for acquiring a semiconductor pattern image as an image processing target in an image processing system according to the present embodiment. Note that the image generation tool to be applied to the present embodiment is not limited to the scanning electron microscope. For example, a focused ion beam (FIB) apparatus that generates an image based on scanning of an ion beam may be used for the image generation tool.

The scanning electron microscope 10 illustrated in FIG. 1 includes an imaging unit 101, a computer system 102, a signal processing unit 103, an input/output unit 104, and a storage unit 105.

The imaging unit 101 includes an electron gun 106 that emits an electron beam 107, a condenser lens 108 that converges the electron beam 107, and a condenser lens 109 that further converges the electron beam 107 passed through the condenser lens 108. The imaging unit 101 further includes a deflector 110 that deflects the electron beam 107, and an objective lens 111 that controls a height at which the electron beam 107 is focused.

The electron beam 107 passed through an optical system of the imaging unit 101 irradiates a sample 112 placed on a sample stage 113. Secondary electrons (SE) 114 emitted from the sample 112 by the irradiation with the electron beam 107 are mainly detected by a secondary electron detector (upper detector) 115. Further, backscattered electrons (BSE) 116 emitted from the sample 112 are mainly detected by a backscattered electron detector (lower detector) 117.

The computer system 102 controls the imaging unit 101. The signal processing unit 103 generates SEM images (SE image, BSE image) based on outputs of the upper detector 115 and the lower detector 117. When a detection signal is to be stored in a frame memory in synchronization with scanning by a scanning deflector (not illustrated), the signal processing unit 103 generates a signal profile (one-dimensional information) and the SEM images (two-dimensional information) by storing the detection signal at a position of the frame memory corresponding to a scanning position. The storage unit 105 also functions as a non-transitory recording medium that stores a computer program for controlling an operation of the present system. The input/output unit 104 receives various instructions (various switches, keyboard, touch screen, etc.) from an operator and outputs a generated signal profile, SEM images, or the like to a display (not illustrated) or the like.

<Acquisition of SEM Images>

Referring to FIG. 2 to FIG. 5, a method of acquiring SEM images under different detection conditions using the scanning electron microscope 10 illustrated in FIG. 1 will be described. Specifically, for detailed observation of the structural characteristics of a sample (layer structures or surface irregularities, and the like), SEM images (shaded images) with shadow information according to the structural characteristics of the sample and a method for arranging detectors for acquiring shaded images will be described.

(i) Configuration Example of Lower Detector 117

Figure 2:
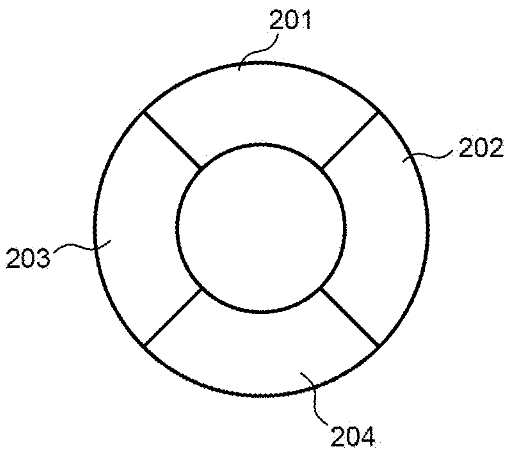
FIG. 2 illustrates an example of a lower detector 117 comprising four shaded image detectors 201 to 204.

FIG. 2 illustrates an example of the lower detector 117 comprising four shaded image detectors 201 to 204. The shaded image detector 201 to the shaded image detector 204 acquire BSE emitted in different directions out of BSE emitted from the sample irradiated with the electron beam 107 and generate SEM images from the signals acquired by the respective shaded image detectors 201 to 204.

(ii) Formation of Shaded Image

Figure 3:
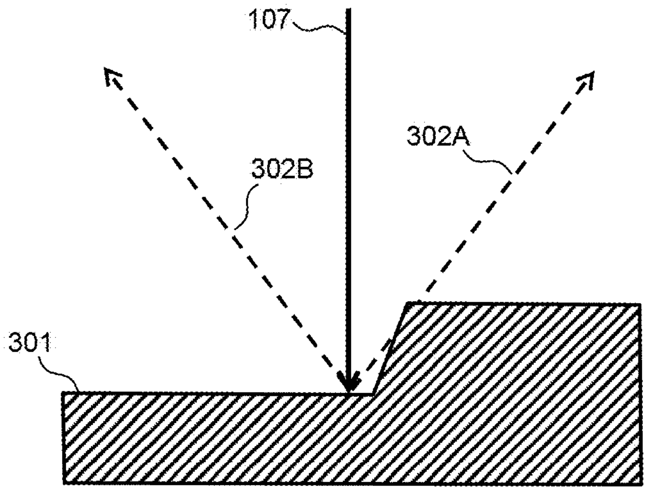
FIG. 3 illustrates the scanning electron microscope 10 illustrated in FIG. 1, where a sample 301 is irradiated with an electron beam 107, and BSE 302A and BSE 302B are emitted from an irradiation position.

FIG. 3 illustrates the scanning electron microscope 10 illustrated in FIG. 1, where a sample 301 is irradiated with the electron beam 107, and BSE 302A and BSE 302B are emitted from an irradiation position. As illustrated in FIG. 3, the sample 301 has irregularities on its surface. When the BSE 302A are acquired by the shaded image detector 202 and the BSE 302B are acquired by the shaded image detector 203, the BSE 302A are blocked by a projection of the sample. Thus, the number of BSE acquired by the shaded image detector 202 is smaller than the number of BSE acquired by the shaded image detector 203. In this case, on the SEM image generated from the signal acquired by the shaded image detector 202, the irradiation position of FIG. 3 forms a shadow. In contrast, on the SEM image generated from the signal acquired by the shaded image detector 203, the irradiation position of FIG. 3 does not form a shadow, and the SEM image has a brightness according to the material characteristics of the sample.

(iii) Examples of Shaded Image

Figure 4:
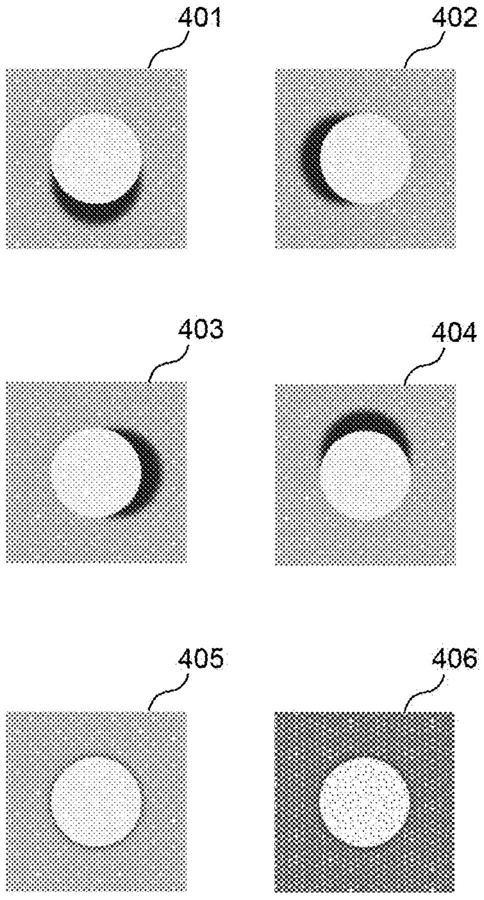
FIG. 4 illustrates examples of a plurality of SEM images acquired with respect to a sample (pillar circuit pattern) using the scanning electron microscope 10 of FIG. 1 and the shaded image detectors of FIG. 2.

FIG. 4 illustrates examples of a plurality of SEM images acquired with respect to a sample (pillar circuit pattern) using the scanning electron microscope 10 of FIG. 1 and the shaded image detectors of FIG. 2. A shaded image 401 to a shaded image 404 are SEM images respectively generated from the signals acquired by the shaded image detector 201 to the shaded image detector 204. These SEM images have different shadow information according to the structural characteristics of the sample.

A top-down image 405 is a SEM image (BSE image) with substantially no shadow information, obtained by combining the signals acquired by the shaded image detector 201 to the shaded image detector 204. A top-down image 406 is a SEM image (SE image) generated from the signal acquired by the upper detector 115. Examples of the shadow information of the present embodiment may include direction, density, and size (area) of the shadow on the SEM image, or the like.

Note that although the lower detector 117 comprises the four shaded image detectors 201 to 204 in FIG. 2, the lower detector 117 may comprise any number of shaded image detectors, for example, two or three shaded image detectors. The number of shaded image detectors is not limited. However, when the lower detector 117 comprises a single detector, shadow information produced due to different emission directions of BSE emitted from the sample is lost since a vector is synthesized from the BSE. Thus, it is desired that the lower detector 117 of the present embodiment comprise two or more shaded image detectors.

The present embodiment describes the case where the lower detector 117 comprises a plurality of detectors. Likewise, the upper detector 115 may also comprise a plurality of detectors.

(iv) Modification Example of Lower Detector 117

Figure 5:
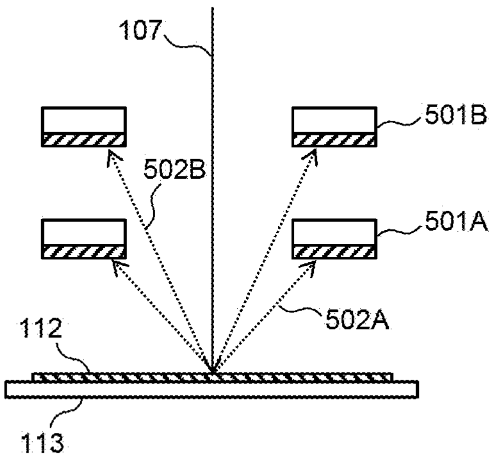
FIG. 5 illustrates a modification example of the lower detector 117, comprising a lower detector 501A and a lower detector 501B in a 2-stage structure.

FIG. 5 illustrates a modification example of the lower detector 117, comprising a lower detector 501A and a lower detector 501B in a 2-stage structure. The lower detector 501A and the lower detector 501B are located at different distances from the sample 112. The lower detector 501A and the lower detector 501B respectively acquire BSE 502A and BSE 502B out of BSE emitted from the sample at different angles with respect to the traveling direction of the electron beam 107. The BSE emitted from the sample 112 have different emission angles due to the irregularities on the surface of the sample 112. In addition, the number of emitted BSE also varies depending on their emission angles, and the number of BSE acquired by each detector also varies. Thus, when each of the lower detector 501A and the lower detector 501B comprises four shaded image detectors as illustrated in FIG. 2, a shaded image acquired by the shaded image detector 201 of the lower detector 501A and a shaded image acquired by the shaded image detector 201 of the lower detector 501B have different shadow information.

Note that the following describes the image processing when the lower detector 117 comprises either the lower detector 501A or the lower detector 501B. However, the lower detector 117 may comprise both of the lower detector 501A and the lower detector 501B, or the distance between the lower detector 117 and the sample 112 may be structurally changed.

<Image Processing System with Training Process Function>

Figure 6:
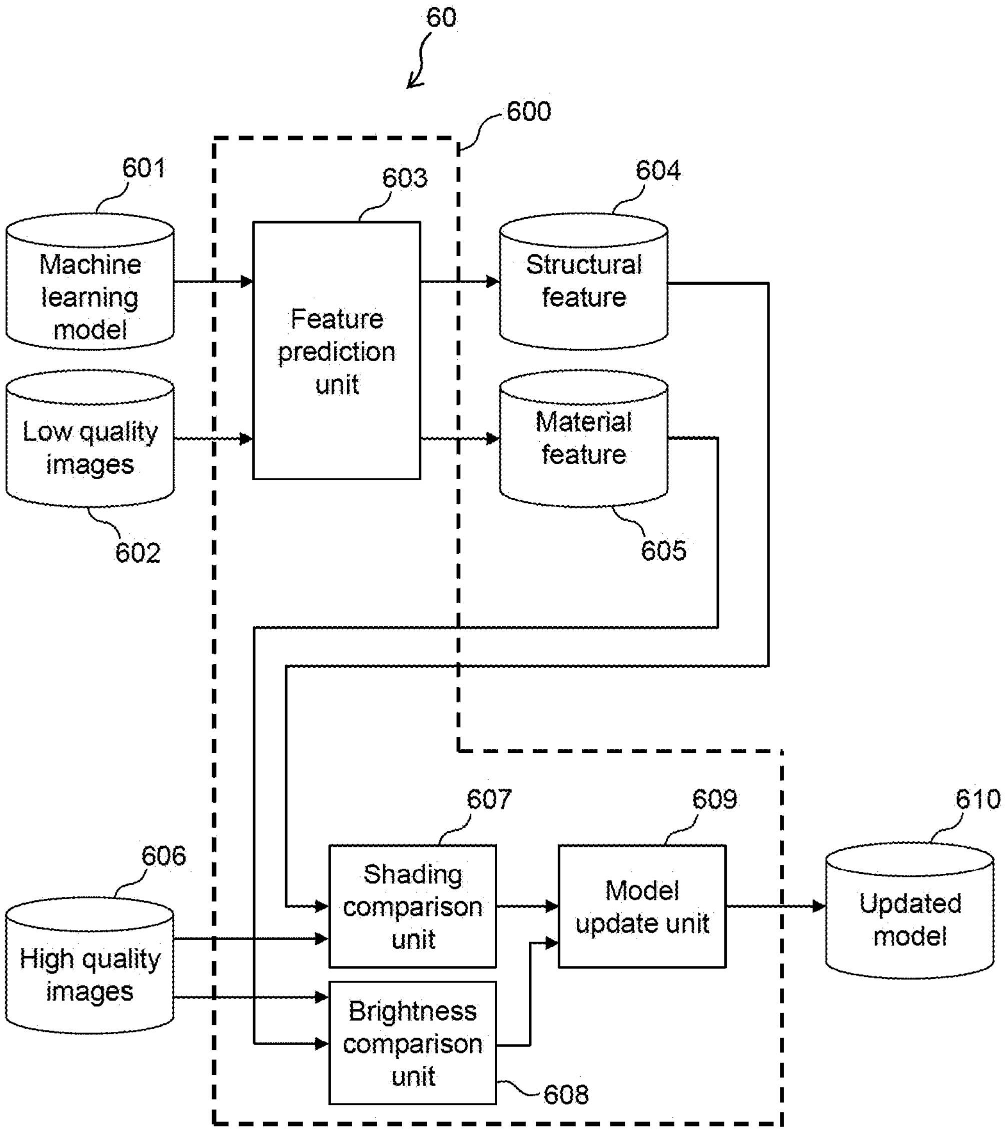
FIG. 6 illustrates a configuration example of an image processing system 60 that performs a training process for creating a machine learning model according to the present embodiment.
Figure 7:
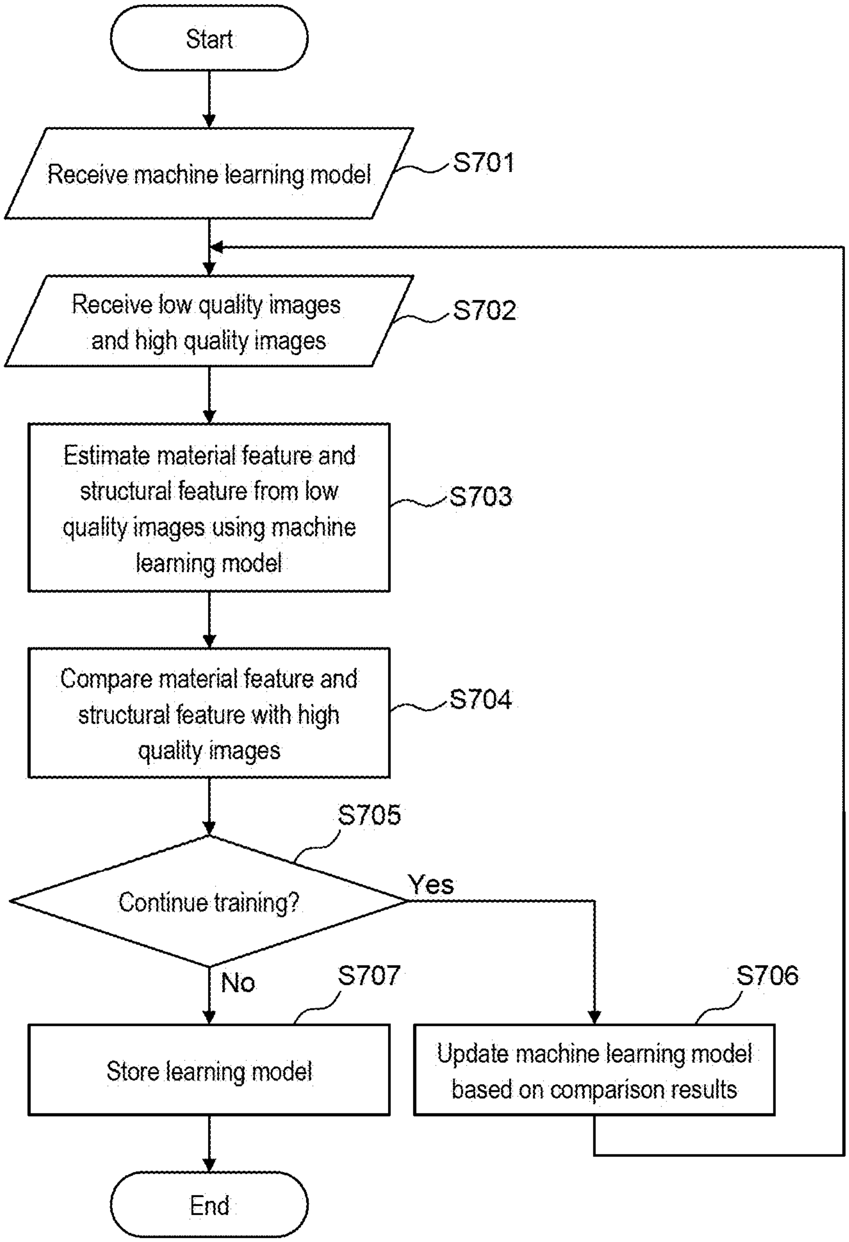
FIG. 7 is a flowchart for explaining a procedure for the training process according to the present embodiment.

Referring to FIG. 6 and FIG. 7, a training process for creating a machine learning model in the image processing system of the present embodiment will be described. The image processing system uses a plurality of low quality SEM images (low quality images) and a plurality of high quality SEM images (high quality images) acquired with the configuration of the scanning electron microscope and the detectors illustrated in FIG. 1 and FIG. 2, and allows estimation of a feature indicating structural characteristics (structural feature) and a feature indicating material characteristics (material feature) of a sample on the high quality image from the plurality of low quality images.

FIG. 6 illustrates a configuration example of an image processing system 60 that performs a training process for creating a machine learning model according to the present embodiment. The image processing system 60 includes a computer system 600 configured to have a machine learning model 601, a low quality images 602, and a high quality images 606 as inputs, and to output a structural feature 604, a material feature 605, and an updated model 610. Main functions of the image processing system 60 are executed by the computer system 600.

The computer system 600 includes one or more computer subsystems each including one or more CPUs. The one or more computer subsystems can use one or more processors to implement processing described below by software, or may implement the processing partially or entirely by hardware such as an electronic circuit.

As an example, the computer system 600 includes a feature prediction unit 603, a shading comparison unit 607, a brightness comparison unit 608, and a model update unit 609. The feature prediction unit 603, the shading comparison unit 607, the brightness comparison unit 608, and the model update unit 609 may be virtually implemented by software or may be implemented by hardware such as an electronic circuit.

The computer system 600 receives the machine learning model 601, the low quality images 602, and the high quality images 606. The feature prediction unit 603 estimates, from the low quality images 602, the structural feature 604 and the material feature 605 of the sample 112 on the high quality images 606 using the machine learning model 601. The shading comparison unit 607 calculates shadow data of the sample from the structural feature 604 and calculates shadow data from the high quality images 606, and then compares the calculated shadow data. The brightness comparison unit 608 calculates gradation data of the sample from the material feature 605 and calculates gradation data from the high quality images 606, and then compares the calculated gradation data. The model update unit 609 updates parameters of the machine learning model 601 according to a comparison result obtained by the shading comparison unit 607 and a comparison result obtained by the brightness comparison unit 608, and outputs (saves) the updated model 610.

The machine learning model 601 may be configured by two models, that is, a model for estimating a structural feature from the low quality images 602 and a model for estimating a material feature 605 from the low quality images 602, or may be configured by one model for estimating both of a structural feature and a material feature from the low quality images 602. In the present embodiment, as the machine learning model 601, a convolutional neural network (CNN) model is applied. At this time, the parameters of the machine learning model 601 saved by the model update unit 609 include filter weights of convolutional layers of the CNN model or the like.

The structural feature 604 and the material feature 605 estimated by the feature prediction unit 603 may be stored in a physical memory (not illustrated) of the computer system 600, or may be stored in a binary file format or in an image file format, or the like in a storage device (not illustrated), such as a hard disk.

The low quality images 602 includes a plurality of SEM images (SE image and BSE image) acquired under a low quality imaging condition using the scanning electron microscope 10 with the configuration illustrated in FIG. 1 and FIG. 2. The SEM images have variations produced due to differences in acquired signals of the detectors as illustrated in FIG. 4. Meanwhile, the high quality images 606 includes a plurality of SEM images acquired under a high quality imaging condition using the scanning electron microscope 10 with the configuration illustrated in FIG. 1 and FIG. 2. The SEM images have image variations produced due to differences in acquired signals of the detectors as illustrated in FIG. 4. Differences between the low quality imaging condition and the high quality imaging condition include, for example, the number of frame integrations or a resolution of the SEM image. The SEM image has reduced noise as the number of frame integrations increases, and has a higher resolution as the pixel resolution increases. In the present embodiment, one of the number of frame integrations or the pixel resolution of the high quality images 606 is equal to the corresponding one of the low quality images 602 and the other one of the number of frame integrations or the pixel resolution of the high quality images 606 is larger (higher) than the corresponding one of the low quality images 602. Or, both of the number of frame integrations and the pixel resolution of the high quality images 606 are larger (higher) than those of the low quality images 602. The other methods of acquiring the high quality images 606 include a method of improving visibility by changing an acceleration voltage or the like of the scanning electron microscope 10. Note that the file format of the low quality images 602 and the high quality images 606 may be an image file format such as TIFF, GIF, PNG or a binary file format.

<Training Process for Machine Learning Model>

(i) Summary of Training Process

In the training process for the machine learning model, the low quality images 602 and the high quality images 606 form a pair acquired at the same position of the sample and in the same field of view (FoV). Further, as described above, the low quality images 602 and the high quality images 606 each include a plurality of SEM images with variations as illustrated in FIG. 4, produced due to differences in arrangement of the detectors or due to differences in acquired signals of the detectors. These low quality images 602 and high quality images 606 in pairs, captured at different positions of the sample, are used as a training data set. In this training data set, a structural feature and a material feature estimated from a given low quality image are compared with the corresponding high quality image in the pair by the shading comparison unit 607 and the brightness comparison unit 608. To improve the generalizability of the machine learning model 601, it is preferable that the training data set contains a larger number of images and a wider variety of circuit pattern shapes.

(ii) Low Quality Images 602

Methods for inputting the low quality images 602 to the CNN model as the machine learning model 601 include reading the shaded images and the top-down images of the low quality images 602 each as a three-dimensional array (height, width, channel), connecting the three-dimensional arrays together in the channel direction, and then inputting the result to the CNN model. Here, the height represents the number of pixels in a vertical direction of the image, and the width represents the number of pixels in a horizontal direction of the image. The channel represents the number of types of color information, or the like. For example, the number of channels is 3 when the color information is represented in RGB, and the number of channels is 1 when the color information is represented in grayscale. Further, when the BSE image and the SE image are stored in the same array, the number of channels is set to 2, so that the BSE image and the SE image are respectively stored in the channels.

(iii) Structural Feature 604

The structural feature 604 is a feature indicating structural characteristics of the sample on the corresponding high quality image, estimated from the low quality images 602 using the machine learning model 601. Examples of the structural feature 604 include a normal map, a bump map, a height map, or a displacement map, which represent layer structures or surface irregularities of a sample. Examples of the information inputted to the CNN model to predict the structural feature 604 include the SEM image 401 to the SEM image 404 illustrated in FIG. 4. These SEM images have different shadow information according to the structural characteristics of the sample 112.

In the present embodiment, the structural feature 604 outputted by the CNN model forms a normal map of the sample on the high quality image corresponding to the input low quality image. Here, the normal map represents, for example, the direction (three-dimensional unit vector volume) in which, when the sample 112 is irradiated with the electron beam 107, a dominant amount of electrons are emitted from the irradiation position. The normal map also includes information of the shadow produced on the pattern surface of the lower layer or the like as it is shielded by its adjacent pattern structure (e.g., multilayer structure), in addition to the irregularities on the sample surface. More specifically, it can be said that the normal map represents information indicating the direction in which light directed to the sample 112 from above is reflected, and the direction of the shadow formed when the light is incident on the sample 112. By computing an inner product of this normal map and a vector volume representing the direction of the detector (each direction of the lower detector 201 to the lower detector 204 from the electron beam irradiation position), a shading map can be obtained, which represents an attenuation factor (a decimal greater than or equal to 0 and less than or equal to 1) of brightness caused by the shadow at each position of the sample.

(iv) Material Feature 605

The material feature 605 is a feature indicating material characteristics of the sample on the corresponding high quality images 606, estimated from the low quality images 602 using the machine learning model 601. Examples of the material feature 605 include a predicted image of the top-down image of the high quality images 606. This predicted image may be an image predicted while including imaging noise of the top-down image of the high quality images 606 or may be an image predicted while removing the imaging noise. Examples of the information inputted to the CNN model to predict the material feature 605 include a SEM image (top-down image 405) that is a synthesized image generated from the SEM image 401 to the SEM image 404 illustrated in FIG. 4 and a SEM image (top-down image 406) that is a top-down image of the sample 112. The material feature 605 as an output is a predicted image of the top-down image of the high quality image corresponding to the input low quality image, and includes a predicted BSE image and a predicted SE image.

(v) Example of Comparison Method in Shading Comparison Unit 607

First, the shading comparison unit 607 computes a shading map (each value of the map is from 0 to 1) corresponding to the shaded images of the high quality images 606, from an inner product of the normal map estimated from the low quality images 602 as the structural feature 604 and the three-dimensional unit vector volume representing the position of each of the detectors that have acquired the plurality of shaded images of the high quality images 606.

Next, the shading comparison unit 607 multiplies the top-down image created by addition of the plurality of shaded images of the high quality images 606 and the above-described shading map, creates a predicted image of the shaded image, and computes a difference (e.g., mean square error) from the shaded image of the corresponding high quality images 606. The shading comparison unit 607 performs this on each shaded image for all of the shaded images of the high quality images 606, and obtains the sum of the computed differences as a loss value.

(vi) Example of Comparison Method in Brightness Comparison Unit 608

The brightness comparison unit 608 compares the predicted BSE image and the predicted SE image estimated from the low quality images 602 as the material feature 605, with the top-down image (ground truth image) of the corresponding high quality images 606, and obtains the difference (e.g., mean square error) therebetween as a loss value.

(vii) Model Update Unit 609

The model update unit 609 updates parameters (e.g., filter weights of the CNN) of the machine learning model 601 using an optimizer such as Adam or SGD such that the loss values computed by the shading comparison unit 607 and the brightness comparison unit 608 are minimized. Then, the updated model 610 is saved in a predetermined file format.

(viii) Example of Learning Model Including Two CNN Models

The machine learning model 601 may be configured by two CNN models, that is, a first CNN model for estimating a normal map and a second CNN model for estimating a predicted image of a top-down image. Hereinafter, an exemplary input and output format of each model will be described.

The input to the first CNN model is a three-dimensional array obtained by, for example, reading a plurality of shaded images of the low quality images 602 as three-dimensional arrays (height, width, channel) and connecting them together in the channel direction. From the obtained three-dimensional array, the first CNN model predicts, as a three-dimensional array, a normal map of the sample on the high quality images 606. At this time, in the three-dimensional array of the normal map, the height and width of the array are equal to the height and width of the high quality images 606, and the number of channels of the array is 3. The channels correspond to x component, y component, and z component of the normal vector, respectively.

The input to the second CNN model is a three-dimensional array obtained by, for example, reading a plurality of top-down images (BSE image, SE image) of the low quality images 602 as three-dimensional arrays (height, width, channel) and connecting them together in the channel direction. From the obtained three-dimensional array, the second CNN model predicts, as a three-dimensional array, a predicted image of the top-down image on the high quality images 606. At this time, the height and width of the three-dimensional array are equal to the height and width of the high quality images 606, and the number of channels of the predicted three-dimensional array is 2. The predicted BSE image and the predicted SE image are respectively stored in the channels.

Note that the input and output format of the first CNN model and the second CNN model described herein is an example. The input and output format is not limited to the above-described format.

<Procedure for Training Process>

FIG. 7 is a flowchart for explaining a procedure for the training process according to the present embodiment. Note that an operation subject of each step is the computer system 600. As an example, the computer system 600 may be configured to read a program (training process program) for implementing the training process from a storage device (not illustrated: this may be an internal memory of the computer system 600 or an external storage device) and execute each step.

(i) Step S701

The computer system 600 receives, as an input, the machine learning model 601 (for example, CNN model), and sets the machine learning model 601 in the feature prediction unit 603. Note that the machine learning model 601 as an input may be initialized using the He initialization or the Xavier initialization, which are known as CNN weight initialization methods, or a model created in advance through the same procedure as the present training process may be used.

(ii) Step S702

The computer system 600 receives, as inputs, the low quality images 602 and the high quality images 606 serving as the training data. The low quality images 602 and the high quality images 606 are images acquired under different imaging conditions with an image generation tool (scanning electron microscope 10). The low quality images 602 and the high quality images 606 may be temporarily stored in the storage device (not illustrated) and then inputted to the computer system 600 or may be directly inputted to the computer system 600 from the image generation tool.

(iii) Step S703

The computer system 600 causes the feature prediction unit 603 to estimate the structural feature 604 and the material feature 605 from the low quality images 602 using the machine learning model 601.

(iv) Step S704

The computer system 600 causes the shading comparison unit 607 to compare the shadow data calculated from the structural feature 604 and the shadow data calculated from the high quality images 606 and also causes the brightness comparison unit 608 to compare the gradation data calculated from the material feature 605 and the gradation data calculated from the high quality images 606.

(v) Step S705

The computer system 600 determines whether to continue the training process according to a comparison result of the shadow data and a comparison result of the gradation data. If the computer system 600 determines to continue the training process (Yes in step S705), the process proceeds to step S706. If the computer system 600 determines not to continue the training process (No in step S705), the process proceeds to step S707.

The determination of whether to continue the training process may be made based on the loss values calculated as the comparison results obtained in step S704. For example, the training process is continued if the loss value is greater than or equal to a reference value (threshold) specified in advance by a user. If the loss value is less than or equal to the reference value, the process proceeds to step S707. As another method, the determination may be made based on the number of updates to the model parameters, irrespective of the comparison results obtained in step S704. At this time, in step S705, the training process is continued if the number of updates to the model parameters is less than or equal to the number specified in advance by the user. If the number of updates to the model parameters reaches the specified number, the process proceeds to step S707.

(vi) Step S706

The computer system 600 updates the parameters of the machine learning model 601 based on the comparison result of the shadow data and the comparison result of the gradation data. The parameter update may be performed through typical backpropagation. Thereafter, the process proceeds to step S702, and then the processes in step S702 through step S705 are executed again.

(vii) Step S707

The computer system 600 stores the machine learning model 601 having parameters at this point, and ends the training process.

<Generation of Synthesized High Quality Image>

(i) Summary of Generation of Synthesized High Quality Image

Referring to FIG. 8 to FIG. 11, an image synthesis process for creating a synthesized high quality image in an image processing system 80 of the present embodiment will be described. The image processing system 80 uses a plurality of low quality images acquired by the upper detector 115 and the lower detector 117 of the scanning electron microscope 10 illustrated in FIG. 1 and FIG. 2, a trained model created through the training process illustrated in FIG. 6 and FIG. 7, and a synthesis parameter inputted by a user, and estimates, from the plurality of low quality images, a feature indicating structural characteristics (structural feature) and a feature indicating material characteristics (material feature) of the sample 112 on the high quality image. Next, the image processing system 80 calculates shadow data based on the structural feature and the synthesis parameter. Further, the image processing system 80 calculates gradation data based on the material feature and the synthesis parameter. Then, the image processing system 80 performs image synthesis based on the shadow data and the gradation data, and generates a synthesized high quality image.

(ii) Configuration Example of Image Processing System 80

Figure 8:
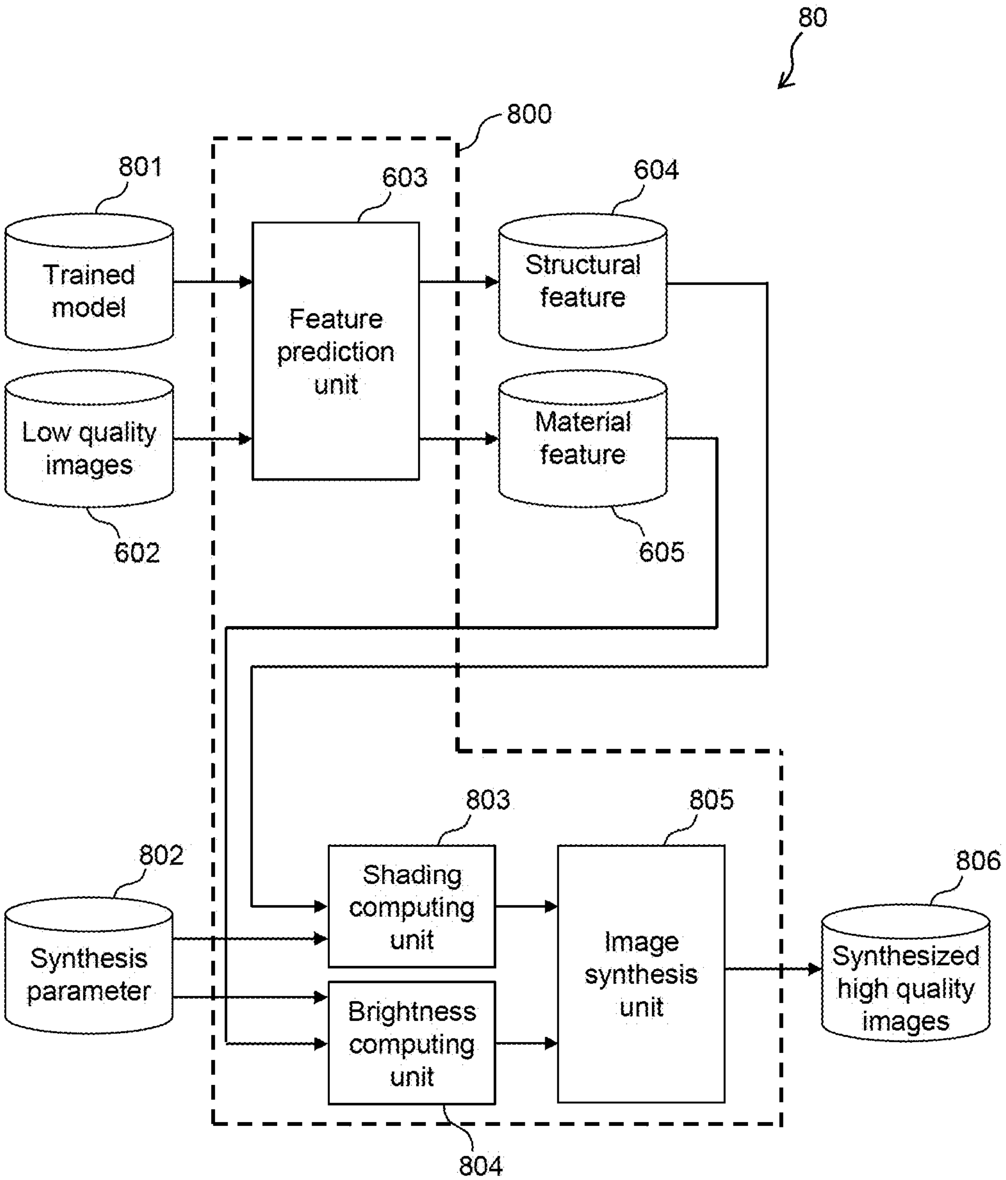
FIG. 8 illustrates a configuration example of an image processing system that executes an image synthesis process for generating a synthesized high quality image according to the present embodiment.

FIG. 8 illustrates a configuration example of the image processing system that executes an image synthesis process for generating a synthesized high quality image according to the present embodiment. Functions of the image processing system 80 are implemented by a computer system 800.

The computer system 800 includes one or more computer subsystems each including one or more CPUs. The one or more computer subsystems can use one or more processors to implement processing described below by software, or may implement the processing partially or entirely by hardware such as an electronic circuit.

As an example, the computer system 800 includes a feature prediction unit 603, a shading computing unit 803, a brightness computing unit 804, and an image synthesis unit 805. The feature prediction unit 603, the shading computing unit 803, the brightness computing unit 804, and the image synthesis unit 805 may be virtually implemented by software or may be implemented by hardware such as an electronic circuit. Further, the computer systems 600, 800 may be the same computer system, or may be computer systems independent of each other.

The computer system 800 receives a trained model 801, a low quality images 602, and a synthesis parameter 802. The feature prediction unit 603 estimates, from the low quality images 602, the structural feature 604 and the material feature 605 of the sample 112 on the high quality image corresponding to the low quality images 602 using the trained model 801.

The shading computing unit 803 calculates shadow data based on the structural feature 604 and the synthesis parameter 802. Further, the brightness computing unit 804 calculates gradation data based on the material feature 605 and the synthesis parameter 802.

The image synthesis unit 805 creates a synthesized high quality image 806 based on the shadow data calculated by the shading computing unit 803 and the gradation data calculated by the brightness computing unit 804, and outputs (saves) the synthesized high quality image 806.

The trained model 801 is a model trained with correspondences between the low quality images 602 and the high quality images 606 through the training process described referring to FIG. 6 and FIG. 7. Thus, the trained model 801 can estimate, from the low quality images 602 as an image synthesis target, the structural feature 604 and the material feature 605 of the sample on the high quality image corresponding to the low quality images 602.

The trained model 801 estimates a structural feature and a material feature based on the correspondences between the low quality images and the high quality images used through the training process for the trained model 801. Thus, it is desired that imaging condition (e.g., the number of frame integrations or the pixel resolution) of the low quality images 602 inputted through the image synthesis process be the same as that used through the training process.

Furthermore, the trained model 801 can estimate, from the combination of the plurality of shaded images of the low quality images 602, a normal map of the sample on the high quality image corresponding to the low quality images 602, by the above-described training process. In addition, the trained model 801 can estimate, from the top-down images (a SEM image (top-down image 405) generated by combining the BSE image 401 to the BSE image 404, and a SEM image (top-down image 406) corresponding to the SE image) of the low quality images 602, a predicted image (predicted BSE image, predicted SE image) of the top-down image of the high quality image corresponding to the low quality images 602.

The synthesis parameter 802 includes two or more types of parameter specifying the shadow and brightness of the synthesized high quality image 806. The synthesis parameter 802 is inputted by the user via a GUI (described later), and includes the three-dimensional unit vector representing the direction of the detector that acquires a signal, and a mixing ratio between the predicted BSE image and the predicted SE image.

Examples of the method of computing shadow data (shading map) from the structural feature 604 and the synthesis parameter 802 in the shading computing unit 803 include computing an inner product of the normal map estimated as the structural feature 604 and the three-dimensional unit vector representing the direction of the detector specified by the synthesis parameter 802.

Examples of the method of computing gradation data (brightness map) from the material feature 605 and the synthesis parameter 802 in the brightness computing unit 804 include combining the predicted BSE image and the predicted SE image estimated as the material feature 605 in a mixing ratio specified by the synthesis parameter 802.

Furthermore, in the image synthesis unit 805, methods of creating the synthesized high quality image 806 from the shading map calculated by the shading computing unit 803 and the brightness map calculated by the brightness computing unit 804 include multiplying the shading map and the brightness map. This allows combining the shadow information (intensity and direction) of the shading map with the brightness map.

Note that the file format used in saving the synthesized high quality image 806 may be an image file format such as TIFF, GIF, PNG or a binary file format.

<Procedure for Image Synthesis Process>

Figure 9:
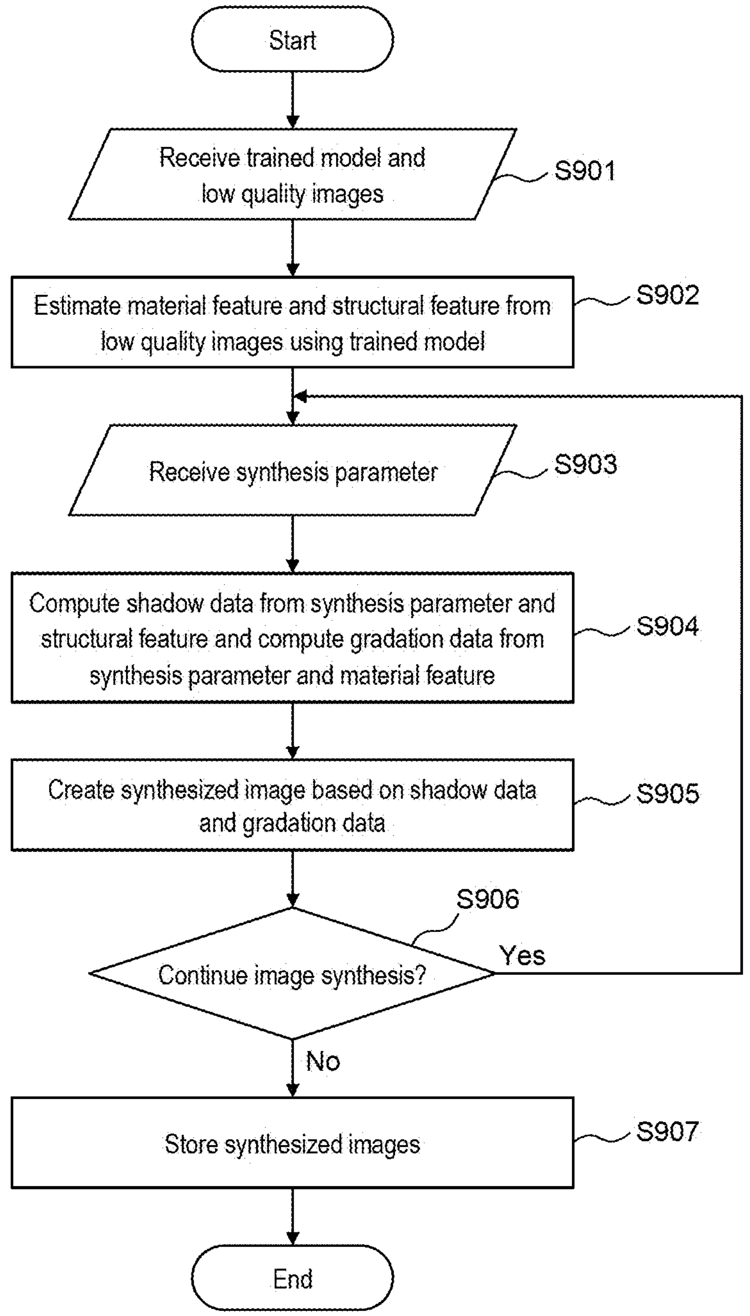
FIG. 9 is a flowchart for explaining a procedure for the image synthesis process according to the present embodiment.

FIG. 9 is a flowchart for explaining a procedure for the image synthesis process according to the present embodiment. Note that an operation subject of each step is the computer system 800. As an example, the computer system 800 may be configured to read a program (image synthesis program) for implementing the image synthesis process from a storage device (not illustrated: this may be an internal memory of the computer system 800 or an external storage device) and execute each step.

(i) Step S901

The computer system 800 receives, as inputs, the trained model 801 created through the procedure illustrated in FIG. 7 and the low quality images 602, and sets the trained model 801 in the feature prediction unit 603.

(ii) Step S902

The computer system 800 causes the feature prediction unit 603 to estimate the structural feature 604 and the material feature 605 from the low quality images 602 using the trained model 801.

For the estimation of the structural feature 604, shadow information according to the structural characteristics of the low quality images 602 is used. Examples of the shadow information include the SEM image 401 to the SEM image 404 illustrated in FIG. 4. For the estimation of the material feature 605, top-down images of the sample 112 of the low quality images 602 are used. Examples of the top-down images include a SEM image 405 that is a synthesized image generated from the SEM image 401 to the SEM image 404 illustrated in FIG. 4 and a SEM image (top-down image 406) that is a top-down image of the sample 112. Such information is identical to the information used when training the machine learning model.

(iii) Step S903

The computer system 800 receives a synthesis parameter inputted by the user. The synthesis parameter is inputted via a GUI (see FIG. 11).

(iv) Step S904

The computer system 800 calculates shadow data according to the structural feature 604 and the synthesis parameter and calculates gradation data according to the material feature 605 and the synthesis parameter.

(v) Step S905

The computer system 800 generates a synthesized high quality image based on the shadow data and the gradation data calculated in step S904.

(vi) Step S906

The computer system 800 determines whether to continue the image synthesis process based on the synthesized high quality image generated in step S905. If the computer system 800 determines to continue the image synthesis process (Yes in step S906), the process proceeds to step S903. In this case, in step S903, the computer system 800 receives a new synthesis parameter inputted by the user, and executes again the processes in step S904 through step S906. If the computer system 800 determines not to continue the image synthesis process (No in step S906: for example, if a desired image is obtained), the process proceeds to step S907.

Note that the determination of whether to continue the image synthesis process may be made, for example, by the user visually evaluating the generated synthesized high quality image on the GUI screen, and if the generated image has a desired quality, the end of the image synthesis process can be determined (an instruction to end the image synthesis process is inputted to the computer system 800). The user determines whether a desired request is satisfied by evaluating the generated synthesized high quality image from perspectives of visibility of the circuit pattern and defects and the like.

(vii) Step S907

The computer system 800 stores the synthesized high quality image in the storage device (not illustrated) and ends the image synthesis process.

<Application Example of Image Synthesis Process>

Figure 10:
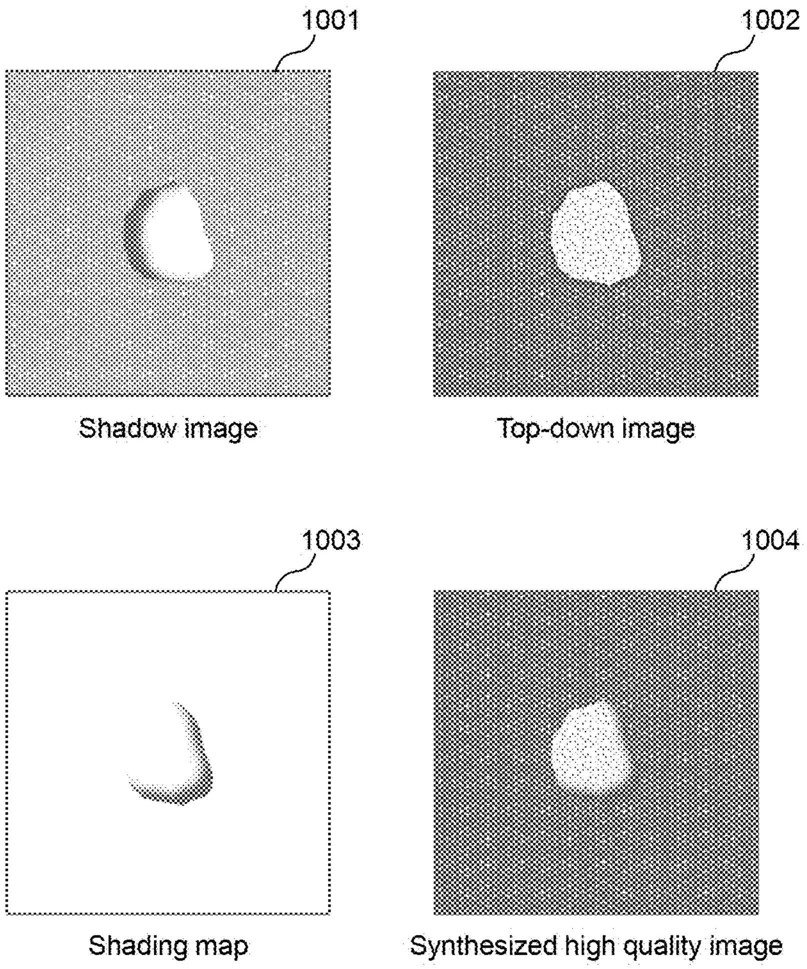
FIG. 10 illustrates an example when the image synthesis process according to the present embodiment is applied to SEM images containing a particle defect.

FIG. 10 illustrates an example when the image synthesis process according to the present embodiment is applied to SEM images containing a particle defect. In FIG. 10, a shaded image 1001 represents a low quality image or a high quality image acquired by the shaded image detector 202, for example, using the scanning electron microscope 10 illustrated in FIG. 1 and FIG. 2. A top-down image 1002 represents a low quality image or a high quality image acquired by the upper detector 115, for example, using the scanning electron microscope 10. A shading map 1003 represents a shading map computed from the normal map estimated as the structural feature 604 and the three-dimensional unit vector representing the direction of the detector specified by the synthesis parameter 802. A synthesized high quality image 1004 represents an image obtained by combining the brightness map as a predicted SE image estimated from the top-down image 1002 of the low quality image and the shading map 1003.

When a synthesized image for defect review is created, depending on the material of the sample or defect type, it may be desirable to keep both of the surface information (material information) of the top-down image 1002 and the shadow information (irregularity information) of the shaded image 1001. In performing image synthesis, as described above, typically, the image of the top-down image 1002 and the image of the shaded image 1001 are combined in a given mixing ratio in many cases. However, combining together both images will decrease the amounts of the surface information of the top-down image 1002 and the shadow information of the shaded image 1001 through averaging (multiplication by the mixing ratio), as compared to those before synthesis. In contrast, by applying the image synthesis process according to the present embodiment, it is possible to combine only the shading map representing the shadow information of the shaded image 1001 with respect to the brightness map representing the surface information of the top-down image 1002, and thus a synthesized image can be created while keeping both of the surface information of the top-down image 1002 and the shadow information of the shaded image 1001. That is, it is possible to avoid loss of the surface information and the shadow information during synthesis.

<Configuration Example of GUI in Image Synthesis Process>

Figure 11:
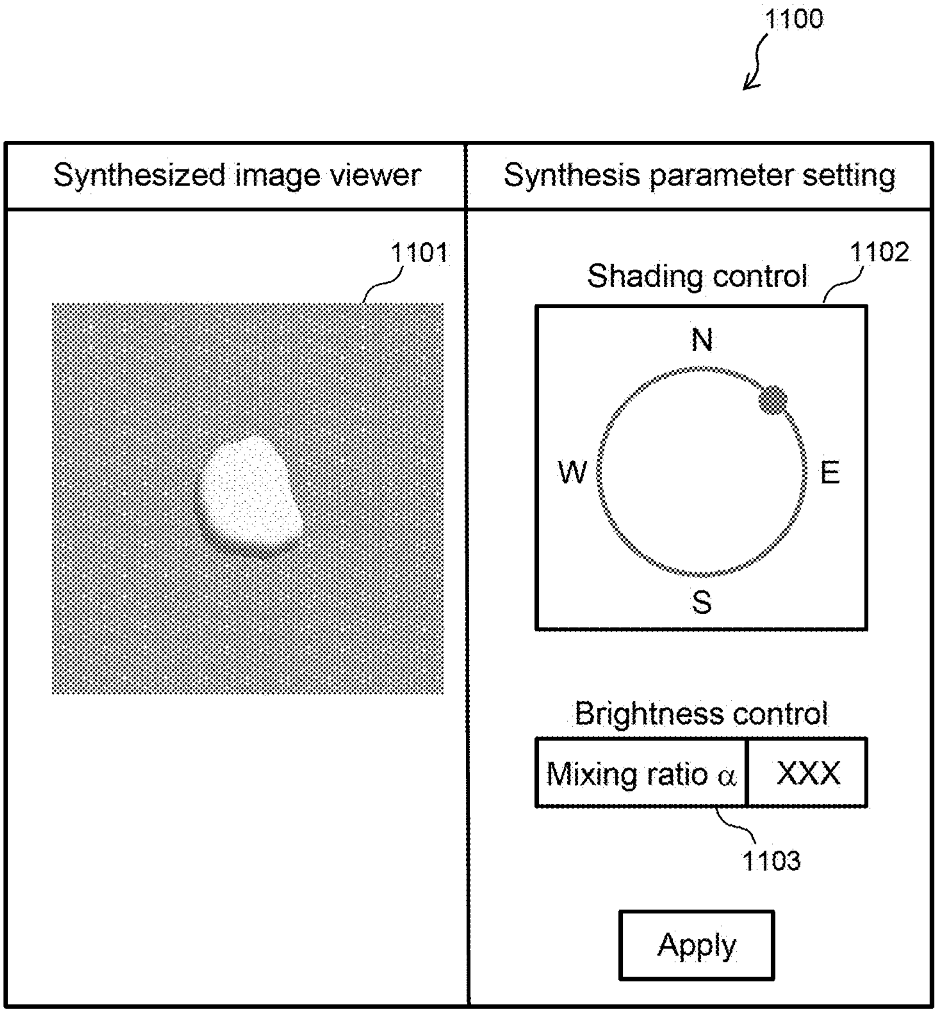
FIG. 11 illustrates a configuration example of a GUI screen 1100 displayed on a display screen used when a user executes an image synthesis process in an image processing system 80 according to the present embodiment.

FIG. 11 illustrates a configuration example of a GUI screen 1100 displayed on a display screen used when a user executes an image synthesis process in the image processing system 80 according to the present embodiment. In the GUI screen 1100, the user can adjust the synthesis parameter 802 for setting the brightness and shadow while checking the created synthesized high quality image.

The GUI screen 1100 includes a synthesized image viewer section 1101, a shading control section 1102, and a brightness control section 1103, for example. Note that in the present embodiment, when the synthesis parameter 802 is adjusted on the GUI screen 1100, the normal map, the predicted BSE image and the predicted SE image are estimated in advance using the low quality images 602 of the sample to be synthesized and the trained model 801. From these normal map, predicted BSE image and predicted SE image, a synthesized high quality image 806 is generated according to the synthesis parameter 802 set by the shading control section 1102 and the brightness control section 1103.

Using the shading control section 1102, the user sets the direction (orientation) of the detector with a circular slider on the screen. The shading computing unit 803 generates a shading map (shadow data) by multiplying the three-dimensional unit vector calculated from the direction of the detector set by the user and the normal map.

Using the brightness control section 1103, the user inputs a mixing ratio $\alpha$ between the predicted BSE image and the predicted SE image. The brightness computing unit 804 computes a weighted average of the predicted BSE image and the predicted SE image according to the mixing ratio $\alpha$ inputted by the user to generate a brightness map (gradation data). The synthesized image viewer section 1101 displays a synthesized high quality image obtained by multiplying the above-described shading map and the above-described brightness map.

MODIFICATION EXAMPLE

The techniques of the present disclosure are not limited to the above-described embodiment and implementation examples, but include various modification examples. Such modification examples include the following.

(i) In the present embodiment, due to different positions of the detectors such as the shaded image detector 201 to the shaded image detector 204 illustrated in FIG. 2 or due to different types of acquired signals (BSE, SE), the plurality of low quality images and the plurality of high quality images include variations in the SEM images illustrated in FIG. 4. Note that the other methods of acquiring SEM images with a plurality of variations include, like a tilt SEM, a method of acquiring SEM images with variations in appearance of the sample according to the relative relationship between the sample and the irradiation angle, by changing the tilt angle of the sample stage 113 or the irradiation angle of the electron beam 107 with respect to the sample 112.

(ii) In the above-described embodiment, as a method of acquiring shaded images, the method of acquiring BSE using the plurality of shaded image detectors as illustrated in FIG. 2 to generate SEM images has been described. However, the method of acquiring shaded images is not limited to this method. In a configuration similar to or different from the configuration of the scanning electron microscope 10 and the upper detector 115 and the lower detector 117 illustrated in FIG. 1 and FIG. 2, shaded images generated from signals of SE or signals including both SE and BSE may be used.

(iii) To realize the techniques of the present disclosure, the present disclosure need not include all of the constituent elements described the foregoing embodiments. For example, it is possible to replace a part of a configuration illustrated in some drawing with a configuration illustrated in another drawing. In addition, it is also possible to add, to a configuration illustrated in some drawing, a configuration illustrated in another drawing. Further, it is also possible to, for a part of a configuration of the present embodiment, add, remove, or substitute a configuration of another embodiment.

Conclusion

The present embodiment proposes roughly two processes: a training process for training a machine learning model and generating a trained model; and a synthesized high quality image generation process for applying a low quality image to the trained model and generating a high quality image.

(i) Regarding Training Process

The present embodiment proposes training a machine learning model using a first quality image (low quality image) and a second quality image (high quality image) with respect to the target sample 112 to generate a trained model for converting the first quality image into the second quality image. More specifically, the computer system 600 receives at least one machine learning model 601, the plurality of low quality images 602, and the plurality of high quality images (each high quality image being acquired at the same position of the sample 112 and in the same FoV as the corresponding low quality images 602) 606. Next, the computer system 600 applies data of the plurality of low quality images 602 to the machine learning model 601, and estimates the structural feature 604 and the material feature 605 of the high quality images 606 corresponding to the plurality of low quality images 602. Further, the computer system 600 causes the shading comparison unit 607 to calculate at least one first shadow datum based on the structural feature 604 and calculate at least one second shadow datum from the plurality of high quality images 606, and to compare the shadow data (acquire a first comparison result). In addition, the computer system 600 causes the brightness comparison unit 608 to calculate at least one first gradation datum based on the material feature and calculate at least one second gradation datum based on the plurality of high quality images 606, and to compare the gradation data (acquire a second comparison result). Then, the computer system 600 updates parameters of the machine learning model based on the first comparison result and the second comparison result. This allows generating a trained model for predicting a high quality image from the low quality images.

Here, the low quality image and the high quality image each include a secondary electron image (SE image) and a backscattered electron image (BSE image) acquired by irradiating the target sample with a charged particle beam using a charged particle beam apparatus 10 (see FIG. 4). The structural feature 604 is estimated by applying the backscattered electron images 401 to 404 of the low quality images 602 to the machine learning model 601. The structural feature 604 may include, for example, at least one of a normal map, a bump map, a height map, or a displacement map, which represent layer structures or surface irregularities of the target sample 112. The material feature 605 is estimated by applying the secondary electron image 406 and the synthesized image 405 of the BSE images of the low quality images 602 to the machine learning model 601. The material feature 605 may include, for example, a brightness map representing differences in acquired signals caused by the material of the target sample 112 as the gradation.

The training process may be repeated until a desired result (a result of a high quality image with high estimation accuracy) can be obtained. Specifically, the computer system 600 completes training of the machine learning model based on whether the first comparison result (a differential value of the shadow data: loss value) and the second comparison result (a differential value of the brightness: loss value) are less than or equal to a predetermined threshold, and obtains a model as of the completion as the trained model. If the loss value is greater than the threshold, the training process is executed again based on backpropagation.

(ii) Synthesized Image Generation Process: Use of Trained Model

The present embodiment further proposes applying the low quality image (first quality image) of the target sample 112 to the trained model 801 to predict and output a high quality image (second quality image). More specifically, the computer system 800 receives the plurality of low quality images 602 (including a SE image and a BSE image) and the synthesis parameter 802, applies data of the low quality images 602 to the trained model 801, and estimates the structural feature 604 and the material feature 605 of the high quality image corresponding to the low quality image. Next, the computer system 800 calculates shadow data based on the structural feature 604 and the synthesis parameter 802, and calculates gradation data based on the material feature 605 and the synthesis parameter 802. Then, the computer system 800 generates a synthesized image from the shadow data and the gradation data, and outputs the synthesized image as a prediction result of the high quality image (synthesized high quality image 806). Since the computer system 800 generates a synthesized high quality image 806 while handling shadow information and brightness information independently of each other, it is possible to predict (synthesize) a high quality image without loss of surface information of the SE image and shadow information of the BSE image.

The structural feature 604 is estimated by applying the backscattered electron images 401 to 404 of the low quality images 602 to the trained model 801. The structural feature 604 may include, for example, at least one of a normal map, a bump map, a height map, or a displacement map, which represent layer structures or surface irregularities of the target sample 112. The material feature 605 is estimated by applying the secondary electron image 406 and the synthesized image 405 of the BSE images of the low quality images 602 to the trained model 801. The material feature 605 may include, for example, a brightness map representing differences in acquired signals caused by the material of the target sample 112 as the gradation.

Further, the synthesis parameter 802 includes parameters specifying the shadow and brightness of the synthesized high quality image 806. The parameter specifying the shadow is, for example, a three-dimensional unit vector representing the direction of the detector (lower detectors 201 to 204) that acquires a signal of the backscattered electron image. The parameter specifying the brightness is a mixing ratio $\alpha$ between the shadow data and the gradation data.

Note that the computer system 800 receives a result of user confirmation of the synthesized high quality image, and determines whether to execute again the synthesized image generation process. Specifically, in response to the user input, the computer system 800 receives again a synthesis parameter including a parameter value different from the synthesis parameter used in the previous synthesized image generation process, and executes again the synthesized image generation process using the synthesis parameter that the computer system 800 has received again (see FIG. 9).

(iii) The functions of the present embodiment may also be implemented by software program code. In this case, a storage medium with the program code recorded thereon may be provided to a system or device, and a computer (or CPU or MPU) of the system or device may read the program code stored on the storage medium. In this case, the program code per se that has been read from the storage medium will provide the functions of the embodiments described above, and the program code per se and the storage medium having the same stored thereon will constitute the present disclosure. Exemplary storage media for supplying such program code include a flexible disc, a CD-ROM, a DVD-ROM, a hard disk, an optical disk, a magneto-optical disk, a CD-R, magnetic tape, a nonvolatile memory card, and a ROM.

Also, an operating system (OS) or the like running on a computer may perform some or all of actual processes based on an instruction of the program code, and the functions of the embodiments described above may be implemented by the processes. Further, after the program code read from the storage medium has been written to a memory on a computer, a CPU or the like of the computer may perform some or all of actual processes based on an instruction of the program code, and the functions of the embodiments described above may be implemented by the processes.

Further, software program code for implementing the functions of an embodiment may be delivered via a network and stored on a storage means, such as a hard disk or a memory of a system or device, or stored on a storage medium such as a CD-RW or a CD-R. In use, the program code may be read from the storage means or the storage medium and performed by a computer (or CPU or MPU) of the system or device.

The processes and techniques described herein are not in essence associated with any specific device, and may be implemented by a combination of components. In addition, various general-purpose devices may be added. A dedicated device may be constructed for performing the functions of the present embodiment. Further, a plurality of constituent elements described in the present embodiment may be combined, as appropriate, to form a variety of functions.

While concrete embodiments of the present disclosure have been described, they are not for limiting purposes but for illustrative purposes in all aspects (understanding of the techniques of the present disclosure). It will be apparent to those skilled in the art that hardware, software, and firmware may be combined in a number of appropriate ways to implement the techniques of the present disclosure. For example, software described may be implemented using a wide variety of programs or script languages, such as assembler, C/C++, perl, Shell, PHP, Java (registered trademark), and the like.

Furthermore, control lines and information lines that are illustrated with respect to the foregoing embodiments are those considered necessary for convenience of description, and do not necessarily represent all of control lines and information lines that are required in a product. All of the configurations may be interconnected.

In addition, those skilled in the art may appreciate that other implementations of the present disclosure are apparent from consideration of the present embodiment. The specification and the specific examples are merely typical examples. The scope and spirit of the techniques of the present disclosure are represented by the following claims.

DESCRIPTION OF SYMBOLS

10 Scanning electron microscope
60, 80 Image processing system
101 Imaging unit
107 Electron beam
301, 112 Sample
113 Sample stage
114 Secondary electron (SE)
115 Secondary electron detector (upper detector)
116 Backscattered electron (BSE)
117 Backscattered electron detector (lower detector)
201 to 204 Shaded image detector (lower detector)
401 to 404 Shaded image (backscattered electron image)
405 Top-down image (BSE synthesized image)
406, 1002 Top-down image (SE image)
102, 600, 800 Computer system
601 Machine learning model
602 Low quality image
603 Feature prediction unit
604 Structural feature
605 Material feature
606 High quality image
607 Shading comparison unit
608 Brightness comparison unit
609 Model update unit
610 Updated model
801 Trained model
802 Synthesis parameter
803 Shading computing unit
804 Brightness computing unit
805 Image synthesis unit
806 Synthesized high quality image
1001 Shaded image
1003 Shading map
1004 Synthesized high quality image

What is claimed is:

1. An image processing system that trains a machine learning model using a plurality of images acquired with respect to a target sample under different imaging conditions, to generate a trained model for converting a first quality image into a second quality image having a higher image quality than the first quality image, the image processing system comprising:

a storage device that stores a training process program for generating the trained model; and a computer that reads the training process program from the storage device and executes a training process for generating the trained model, wherein the computer is configured to execute:

a process of receiving at least one machine learning model, a plurality of first quality images, and a plurality of second quality images having a higher image quality than the first quality images;

a process of applying data of the plurality of first quality images to the at least one machine learning model and estimating a structural feature and a material feature of the second quality image corresponding to the plurality of first quality images;

a process of calculating at least one first shadow datum based on the structural feature;

a process of calculating at least one second shadow datum from the plurality of second quality images;

a first comparing process of comparing the at least one first shadow datum and the at least one second shadow datum;

a process of calculating at least one first gradation datum based on the material feature;

a process of calculating at least one second gradation datum from the plurality of second quality images;

a second comparing process of comparing the at least one first gradation datum and the at least one second gradation datum; and a process of updating parameters of the at least one machine learning model based on a first comparison result obtained by the first comparing process and a second comparison result obtained by the second comparing process.

2. The image processing system according to claim 1, wherein the plurality of first quality images and the plurality of second quality images each include at least one secondary electron image and at least one backscattered electron image acquired by irradiating the target sample with a charged particle beam using a charged particle beam apparatus.

3. The image processing system according to claim 2, wherein the computer applies the at least one backscattered electron image of the first quality image to the at least one machine learning model and estimates a structural feature of the second quality image.

4. The image processing system according to claim 2, wherein the computer applies the at least one secondary electron image of the first quality image to the at least one machine learning model and estimates a material feature of the second quality image.

5. The image processing system according to claim 1, wherein the plurality of first quality images and the plurality of second quality images each include at least one shaded image.

6. The image processing system according to claim 1, wherein the structural feature includes at least one of a normal map, a bump map, a height map, or a displacement map, representing layer structures or surface irregularities of the target sample.

7. The image processing system according to claim 1, wherein the material feature includes a brightness map representing differences in acquired signals caused by a material of the target sample as gradation.

8. The image processing system according to claim 1, wherein the computer further executes a process of completing training of the at least one machine learning model based on whether the first comparison result and the second comparison result are less than or equal to a predetermined threshold, and obtaining a model as of the completion as the trained model.

9. An image processing system that applies a first quality image of a target sample to a trained model to predict and output a second quality image having a higher image quality than the first quality image, the image processing system comprising:

a storage device that stores an image synthesis program for synthesizing the second quality image using the trained model; and a computer that reads the image synthesis program from the storage device and executes an image synthesis process for synthesizing the second quality image, wherein the computer is configured to execute:

a process of receiving a plurality of first quality images and a synthesis parameter;

a process of applying data of the first quality image to the trained model and estimating a structural feature and a material feature of the second quality image corresponding to the first quality image;

a process of calculating at least one shadow datum based on the structural feature and the synthesis parameter;

a process of calculating at least one gradation datum based on the material feature and the synthesis parameter; and a process of generating a synthesized image from the at least one shadow datum and the at least one gradation datum, and outputting the synthesized image as a prediction result of the second quality image.

10. The image processing system according to claim 9, wherein the plurality of first quality images each include at least one secondary electron image and at least one backscattered electron image acquired by irradiating the target sample with a charged particle beam using a charged particle beam apparatus.

11. The image processing system according to claim 10, wherein the synthesis parameter includes a parameter specifying a shadow of the synthesized image and a parameter specifying a brightness of the synthesized image.

12. The image processing system according to claim 11, wherein the parameter specifying a shadow is a three-dimensional unit vector representing a direction of a detector that acquires a signal of the backscattered electron image, and the parameter specifying a brightness is a mixing ratio between the at least one shadow datum and the at least one gradation datum.

13. The image processing system according to claim 9, wherein the computer applies the at least one backscattered electron image of the first quality image to the trained model and estimates a structural feature of the second quality image, and applies the at least one secondary electron image of the first quality image to the trained model and estimates a material feature of the second quality image.

14. The image processing system according to claim 9, wherein the computer receives a result of user confirmation of the synthesized image, and determines whether to execute again a synthesized image generation process.

15. The image processing system according to claim 14, wherein the computer receives again a synthesis parameter including a parameter value different from the synthesis parameter used in the synthesized image generation process previously performed, and executes again the synthesized image generation process using the synthesis parameter that the computer has received again.

16. An image processing method performed by a computer that trains a machine learning model using a plurality of images acquired with respect to a target sample under different imaging conditions, to generate a trained model for converting a first quality image into a second quality image having a higher image quality than the first quality image, the image processing method comprising:

receiving at least one machine learning model, a plurality of first quality images, and a plurality of second quality images having a higher image quality than the first quality images;

applying data of the plurality of first quality images to the at least one machine learning model and estimating a structural feature and a material feature of the second quality image corresponding to the plurality of first quality images;

calculating at least one first shadow datum based on the structural feature;

calculating at least one second shadow datum from the plurality of second quality images;

comparing the at least one first shadow datum and the at least one second shadow datum and acquiring a first comparison result;

calculating at least one first gradation datum based on the material feature;

calculating at least one second gradation datum from the plurality of second quality images;

comparing the at least one first gradation datum and the at least one second gradation datum and acquiring a second comparison result; and updating parameters of the at least one machine learning model based on the first comparison result and the second comparison result.

17. An image processing method performed by a computer that applies a first quality image of a target sample to a trained model, to predict and output a second quality image having a higher image quality than the first quality image, the image processing method comprising:

receiving a plurality of first quality images and a synthesis parameter;

applying data of the first quality image to the trained model and estimating a structural feature and a material feature of the second quality image corresponding to the first quality image;

calculating at least one shadow datum based on the structural feature and the synthesis parameter;

calculating at least one gradation datum based on the material feature and the synthesis parameter; and generating a synthesized image from the at least one shadow datum and the at least one gradation datum, and outputting the synthesized image as a prediction result of the second quality image.

* * * * *